United States Patent
Adams et al.

(10) Patent No.: US 11,316,656 B1
(45) Date of Patent: Apr. 26, 2022

(54) TIME TRANSFER MODEM

(71) Applicant: The Johns Hopkins University, Baltimore, MD (US)

(72) Inventors: Norman H. Adams, Fulton, MD (US); Jeffrey A. Boye, Silver Spring, MD (US); Adam V. Crifasi, Wheaton, MD (US); Blair C. Fonville, Woodstock, MD (US); Ian M. Hughes, Jessup, MD (US); Amit Shah, Columbia, MD (US); Gregory L. Weaver, Carlisle, PA (US); John F. Youssef, Frederick, MD (US); Darrell A. Zinn, Clarksville, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 17/313,308

(22) Filed: May 6, 2021

Related U.S. Application Data

(60) Provisional application No. 63/049,142, filed on Jul. 8, 2020.

(51) Int. Cl.
*H04L 7/00* (2006.01)
*H04B 1/40* (2015.01)
*H04B 1/69* (2011.01)

(52) U.S. Cl.
CPC .............. *H04L 7/0087* (2013.01); *H04B 1/40* (2013.01); *H04L 7/0012* (2013.01); *H04B 1/69* (2013.01)

(58) Field of Classification Search
CPC ........ H04L 7/00; H04L 7/0012; H04L 7/0079; H04L 7/0087; H04B 1/40; H04B 1/69
See application file for complete search history.

(56) References Cited

U.S. PATENT DOCUMENTS

| | | | | | |
|---|---|---|---|---|---|
| 5,828,947 | A | * | 10/1998 | Michel ................... | H04W 52/42 455/12.1 |
| 5,832,379 | A | * | 11/1998 | Mallinckrodt ........ | H04L 1/0047 455/12.1 |
| 5,949,766 | A | * | 9/1999 | Ibanez-Meier .... | H04B 7/18508 455/13.1 |
| 6,549,761 | B1 | * | 4/2003 | Kim ...................... | H04B 1/0475 455/75 |
| 6,647,276 | B1 | * | 11/2003 | Kuwahara .............. | H04B 17/20 455/67.11 |
| 6,771,070 | B2 | * | 8/2004 | Lee ..................... | G01R 33/3456 324/318 |

(Continued)

*Primary Examiner* — James M Perez
(74) *Attorney, Agent, or Firm* — Noah J. Hayward

(57) ABSTRACT

A time transfer modem includes a radio frequency integrated circuit (RFIC), a radio frequency (RF) front end, and processing circuitry. The RF front end is configured to receive and up-convert an input for time transfer with a remote station to generate an up-converted timing signal centered at a select frequency that is outside of a frequency range of interest but within an operational frequency range of the RFIC. The RF front end may also be configured to attenuate, via a pre-selection filter, up-converted adjacent signals to generate a filtered timing signal at the select frequency. The RFIC may be configured to down-convert and digitize the filtered timing signal to generate a digitized timing signal for signal processing by the processing circuitry to determine a clock difference between a local clock signal and the digitized timing signal that originated from the remote station.

20 Claims, 4 Drawing Sheets

(56) References Cited

U.S. PATENT DOCUMENTS

| | | | | |
|---|---|---|---|---|
| 7,088,104 | B2* | 8/2006 | Bottomley | G01R 33/34046 324/322 |
| 7,142,159 | B1* | 11/2006 | Farley | H04B 7/18513 342/357.56 |
| 7,412,247 | B2* | 8/2008 | Hughes | H04L 67/18 455/410 |
| 7,780,596 | B2* | 8/2010 | Kelly | A61B 5/364 600/500 |
| 7,885,667 | B2* | 2/2011 | Hughes | H04L 67/18 455/410 |
| 7,927,277 | B2* | 4/2011 | Kelly | A61B 5/364 600/500 |
| 7,944,993 | B2* | 5/2011 | Dankberg | H04B 7/18517 375/267 |
| 8,254,210 | B2* | 8/2012 | Peacock | G01V 1/22 367/134 |
| 8,649,418 | B1* | 2/2014 | Negus | H04B 7/15592 375/211 |
| 8,861,667 | B1* | 10/2014 | Zerbe | H04L 7/0087 379/398 |
| 9,065,530 | B2* | 6/2015 | Aymes | H04B 7/18519 |
| 9,306,789 | B2* | 4/2016 | Dhayni | H04L 27/2672 |
| 9,325,553 | B2* | 4/2016 | Kaukovuori | H04L 27/2647 |
| 9,344,108 | B2* | 5/2016 | Hampel | H03F 3/2171 |
| 9,425,836 | B2* | 8/2016 | Wang | H04W 4/18 |
| 9,596,120 | B2* | 3/2017 | Yamanouchi | H04L 27/367 |
| 9,780,891 | B2* | 10/2017 | Eo | H04B 17/0085 |
| 9,838,751 | B2* | 12/2017 | Arcidiacono | H04N 21/6193 |
| 9,942,011 | B2* | 4/2018 | Tang | H04L 5/001 |
| 9,998,168 | B2* | 6/2018 | Khlat | H04L 5/14 |
| 10,033,413 | B2* | 7/2018 | Pratt | H03F 1/3247 |
| 10,200,071 | B1* | 2/2019 | Pearce | H04B 7/18519 |
| 11,057,123 | B1* | 7/2021 | Chang | H04B 1/38 |
| 11,101,842 | B2* | 8/2021 | Hormis | H04B 7/086 |
| 11,146,374 | B2* | 10/2021 | Li | H04L 27/2613 |
| 2002/0027957 | A1* | 3/2002 | Paulraj | H04B 7/0842 375/267 |
| 2002/0057751 | A1* | 5/2002 | Jagger | H04B 1/7103 375/346 |
| 2002/0061077 | A1* | 5/2002 | Ohishi | H04H 20/74 375/259 |
| 2002/0061730 | A1* | 5/2002 | Hart | H04B 7/18539 455/12.1 |
| 2002/0173341 | A1* | 11/2002 | Abdelmonem | H04B 1/109 455/296 |
| 2002/0180439 | A1* | 12/2002 | Lee | G01R 33/3415 324/318 |
| 2004/0189378 | A1* | 9/2004 | Suzuki | H03F 3/24 330/52 |
| 2005/0003834 | A1* | 1/2005 | Hughes | H04W 4/029 455/414.2 |
| 2005/0157821 | A1* | 7/2005 | Kim | H04L 27/066 375/326 |
| 2008/0005106 | A1* | 1/2008 | Schumacher | G06F 16/24556 |
| 2008/0261625 | A1* | 10/2008 | Hughes | H04L 67/18 455/456.3 |
| 2011/0117870 | A1* | 5/2011 | Pera | H04B 1/1036 455/313 |
| 2011/0299574 | A1* | 12/2011 | Rofougaran | H03D 7/165 375/219 |
| 2011/0300813 | A1* | 12/2011 | Mirzaei | H03H 7/38 455/78 |
| 2012/0249888 | A1* | 10/2012 | Naik | H04N 5/455 348/E5.113 |
| 2015/0312078 | A1* | 10/2015 | Bogdan | H04L 27/2695 375/226 |
| 2015/0381266 | A1* | 12/2015 | Fujimura | H04B 7/18513 370/318 |
| 2016/0329953 | A1* | 11/2016 | Smart | H01Q 3/26 |
| 2017/0111161 | A1* | 4/2017 | Raggio | H04W 24/08 |
| 2019/0191419 | A1* | 6/2019 | Liu | H04B 7/15507 |
| 2020/0266879 | A1* | 8/2020 | Chia | H04B 7/0828 |
| 2020/0336168 | A1* | 10/2020 | Hormis | H03L 7/22 |
| 2020/0358461 | A1* | 11/2020 | Jussila | H04B 1/1036 |
| 2020/0367257 | A1* | 11/2020 | Hormis | H04B 7/15528 |
| 2021/0028965 | A1* | 1/2021 | Dutronc | H04L 27/2334 |

* cited by examiner

TIME TRANSFER MODEM

CROSS-REFERENCE TO RELATED APPLICATIONS

This application claims priority to and the benefit of prior-filed, U.S. Provisional Application Ser. No. 63/049,142 filed on Jul. 8, 2020, the entire contents of which are hereby incorporated herein by reference.

STATEMENT OF GOVERNMENTAL INTEREST

This invention was made with Government support under contract number N00024-13-D-6400 awarded by the Naval Sea Systems Command (NAVSEA). The Government has certain rights in the invention.

TECHNICAL FIELD

Exemplary embodiments of the present disclosure generally relate to time synchronization systems, and more specifically relate to time transfer modem technologies that can be applied, for example, in systems that involve intermediary satellites.

BACKGROUND

The synchronization of clocks between remote devices can be of utmost importance in a number of contexts. Coordinated timing using synchronized clocks is necessary in communications, metrology, satellite navigation, military, and other applications. Additionally, maintaining clock synchronization can be increasingly difficult between distant stations around the world, where, for example, oceans are located between stations or a station is located in a remote and desolate region of the earth. Even in these situations, it has been determined that accurate clock synchronization is a critical need for Position, Navigation, and Timing (PNT), for example, in global positioning system (GPS) contested environments. Further, accurate clock synchronization has also been identified as a helpful tool in detecting GPS tampering.

Various techniques have been employed to determine if clocks at two different locations are synchronized. If the two clocks are physically located relatively close to each other, techniques to synchronize the clocks may rely upon communications via cabling and account for time delays in the signals as introduced by the cabling. In situations where the clocks are a relatively long physical distance apart (e.g., on either sides of an ocean) the use of cabling may not be feasible, and therefore satellite communications may be used for synchronization of clocks at two different Earth ground stations.

The equipment and signaling used for clock synchronization maintenance can introduce both physical and signaling overhead on the system that can affect throughput, cost, space needs, and the like. As such, there is a continued need to improve the ability to develop systems that operate to maintain clock synchronicity that demand, for example, less size, power, and/or weight.

BRIEF SUMMARY OF SOME EXAMPLES

According to some example embodiments, a time transfer modem is provided. The time transfer modem may include a radio frequency integrated circuit (RFIC), a tunable radio frequency (RF) front end, and processing circuitry. The RFIC may have an operational frequency range, and a frequency range of interest for time transfer signaling may be within the operational frequency range of the RFIC. The tunable RF front end may include a pre-selection filter. The RF front end may be configured to receive an input for time transfer with a remote station. In this regard, the input may include a timing signal originating from the remote station at a timing signal frequency that is within the frequency range of interest and adjacent signals at adjacent frequencies. The RF front end may be further configured to up-convert the input, including the timing signal and the adjacent signals, to generate an up-converted timing signal centered at a select frequency that is outside of the frequency range of interest but within the operational frequency range of the RFIC. Up-converting the input may also generate up-converted adjacent signals from the adjacent signals at up-converted adjacent signal frequencies. In this regard, at least one of the up-converted adjacent signal frequencies may be outside of the operational frequency range of the RFIC. The RF front end may be further configured to attenuate, via the pre-selection filter, the up-converted adjacent signals at the up-converted adjacent frequencies to generate a filtered timing signal at the select frequency. The RFIC may be configured to down-convert and digitize the filtered timing signal to generate a digitized timing signal. The processing circuitry may be configured to track and demodulate the digitized timing signal, and determine a clock difference between a local clock signal and the digitized timing signal that originated from the remote station.

According to some example embodiments, a system is provided. The system may include a remote station including a remote clock and a remote time transfer modem. In this regard, the remote clock may be configured to output a remote clock signal for use by the remote time transfer modem to generate a timing signal for transmission. The system may also include a communications satellite in orbit configured to receive and re-transmit the timing signal, and a local station including a local clock and a local time transfer modem. The local clock configured to output a local clock signal to the local time transfer modem. The local time transfer modem may include a radio frequency integrated circuit (RFIC), a tunable radio frequency (RF) front end, and processing circuitry. The RFIC may have an operational frequency range, and a frequency range of interest for time transfer signaling may be within the operational frequency range of the RFIC. The tunable radio frequency (RF) front end may include a pre-selection filter. The RF front end may be configured to receive an input for time transfer with the remote station. The input may include the timing signal originating from the remote station at a timing signal frequency that is within the frequency range of interest and adjacent signals at adjacent frequencies. The RF front end may be further configured to up-convert the input, including the timing signal and the adjacent signals, to generate an up-converted timing signal centered at a select frequency that is outside of the frequency range of interest but within the operational frequency range of the RFIC. Up-converting the input also generates up-converted adjacent signals from the adjacent signals at up-converted adjacent signal frequencies. At least one of the up-converted adjacent signal frequencies may be outside of the operational frequency range of the RFIC. The RF front end may also be configured to attenuate, via the pre-selection filter, the up-converted adjacent signals at the up-converted adjacent frequencies to generate a filtered timing signal at the select frequency. The RFIC may be configured to down-convert and digitize the filtered timing signal to generate a digitized timing signal.

Additionally, the processing circuitry may be configured to track and demodulate the digitized timing signal, and determine clock difference between the local clock signal and the digitized timing signal that originated from the remote station.

According to some example embodiments, a method for time transfer between a local station and a remote station is provided. The example method may include receiving an input for time transfer with a remote station at a radio frequency (RF) front end. The input may include a timing signal originating from the remote station at a timing signal frequency that is within the frequency range of interest and adjacent signals at adjacent frequencies. The frequency range of interest may be within an operational frequency range of a radio frequency integrated circuit (RFIC). The example method may further include up-converting, by the RF front end, the input, including the timing signal and the adjacent signals, to generate an up-converted timing signal centered at a select frequency that is outside of the frequency range of interest but within the operational frequency range of the RFIC. Up-converting the input may also generate up-converted adjacent signals from the adjacent signals at up-converted adjacent signal frequencies. At least one of the up-converted adjacent signal frequencies may be outside of the operational frequency range of the RFIC. The example method may also include attenuating, via a pre-selection filter of the RF front end, the up-converted adjacent signals at the up-converted adjacent frequencies to generate a filtered timing signal at the select frequency. The example method may also include down-converting and digitizing, by the RFIC, the filtered timing signal to generate a digitized timing signal, tracking and demodulating, by processing circuitry, the digitized timing signal, and determining, by the processing circuitry, a clock difference between a local clock signal and the digitized timing signal that originated from the remote station.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
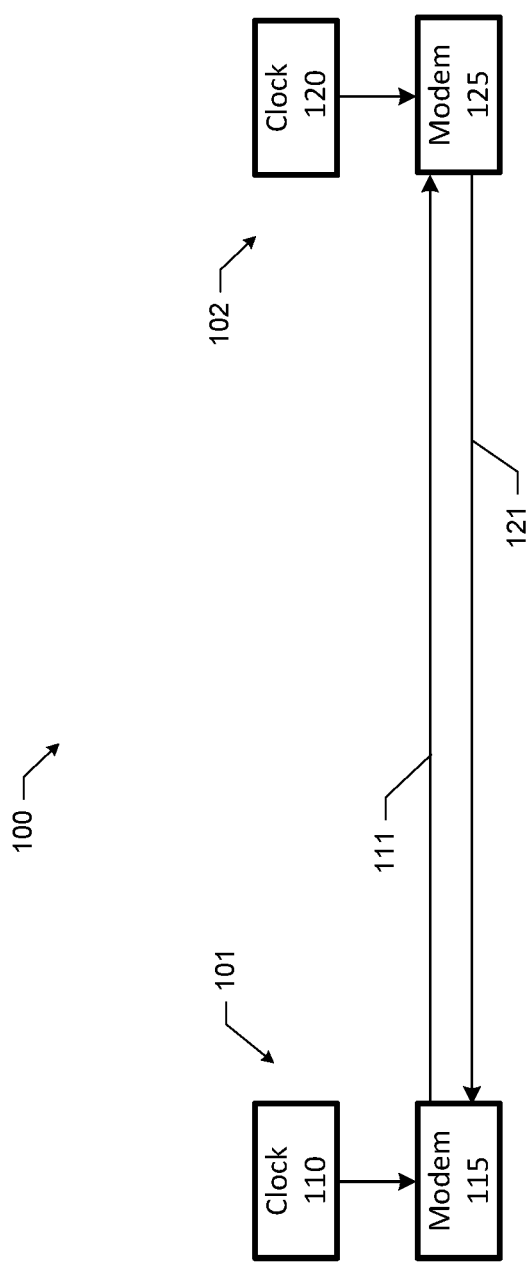
FIG. 1 illustrates an example time transfer system including time transfer modems according to some example embodiments.

Some non-limiting, example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Example embodiments associated with clock synchronization are provided herein that support high accuracy synchronization in both wired and wireless systems. According to some example embodiments, a system of devices or stations, may leverage a novel time transfer modem for performing clock measurements to determine differences between the timing of the clocks of different stations to facilitate clock synchronization and correction schemes. Moreover, the time transfer modem, according to some example embodiments, may be a component or a sub-system of a site or station, where the time transfer modem operates to support the exchange of timing signals for the purpose of determining timing differences to synchronize the clocks for each station. A station may embody or include any type of signaling device, and therefore can be mobile, but is often stationary. As such, in a given system each station that is requiring clock synchronization may employ a respective time transfer modem, and the time transfer modems may use signaling between the stations to determine clock differences.

According to some example embodiments, the time transfer modem may be configured to preform clock measurements with sub-nanosecond accuracy using radio frequency signals and associated communications. In application, according to some example embodiments, the time transfer modem may be operated in either a one-way or two-way time transfer mode. In some instances, the two-way time transfer mode, which may be preferable, may perform signaling through an intermediate satellite. Such signaling may be referred to as two-way satellite time transfer (TW-STT) signaling. While such two-way approaches can have many benefits with respect to the cancellation of common parameters that affect the signaling between the stations, the time transfer modem may also be configured to operate in one-way time transfer mode, which may be a stepping stone to time dissemination and line-of-sight time transfer. Accordingly, while some example embodiments may operate to perform time transfer and determine clock differences between two stations using a one-way communication approach as mentioned above, there are some advantages to using a two-way approach, particularly in the context of a satellite intermediary scheme. However, two-way time transfer approaches, according to some example embodiments, can also add complexity because the time transfer modems should be transmitting and receiving at the same time.

The timing signals used for time transfer and exchanged between stations, and more specifically between the time transfer modems of the stations, may be constructed in a number of ways. According to some example embodiments, the timing signals may be spread spectrum signals that use a spreading code for generating the signals. According to some example embodiments, the spreading code may be memory code, and in some instances, a long memory code having more than 2000 chips. In this regard, a chip may be a pulse of a direct-sequence spread spectrum (DSSS) code, that may be, for example, a rectangular pulse with a +1 or −1 amplitude that is multiplied by a data sequence (which may be +1 or −1 message bits) and a carrier waveform to generate a transmitted signal. The use of a long memory code is in contrast to using, for example, a short polynomial-generated code of length 511 chips or 1023 chips. The use of a memory code may operate to, for example, reduce tracking multi-user interference and apparent clock errors at the time transfer modems. Further, use of a memory code may also facilitate an ability to implement larger numbers of simultaneously operating time transfer modems within the same clock-synchronized system. Additionally, memory codes for use with timing signaling also offer greater flexibility to adapt the exchanged timing signal waveform parameters to reject or inhibit multi-user interference. As further described below, the time transfer modem, according to some example embodiments, may generate the timing signal to include a long memory code that is, for example, 2487 chips or longer in length. According to some example embodiments, a long memory code does not employ a polynomial-generated code.

According to some example embodiments, a time transfer modem may be operatively coupled to or include a station clock. According to some example embodiments, the station clock may provide a frequency reference signal at, for example, 10 Megahertz (MHz). The station clock may additionally or alternatively output a clock signal, which may be provided as an interval pulse signal. According to some example embodiments, the time transfer modem may also employ a time interval counter (TIC) that, for example, performs an interval measurement on the local clock signal and a timescale of the modem itself to determine an on-time point for the modem.

According to various example embodiments, a time transfer modem may also employ a module that may be embodied as or include a radio frequency integrated circuit (RFIC). The module may also include processing circuitry (e.g., in the form of a field programmable logic array [FPGA]) that interfaces with the RFIC. The processing circuitry may be configured to receive a conditioned timing signal from the RFIC that has been received by the time transfer modem and compare the local station clock signal with a remote station clock signal that is present in the received, conditioned timing signal. Operating as a radio for the time transfer modem, the RFIC may control an RF input and an RF output of the time transfer modem to establish a time signaling connection with, for example, a satellite.

To do so, the time transfer modem, according to some example embodiments, may be controlled by the processing circuitry to cause transmission of a timing signal having a waveform that encodes coarse time (second accuracy) and telemetry as data of the waveform, and precise time (nanosecond accuracy) as the phase of the waveform. A receiving time transfer modem and it's processing circuitry may be configured to track the phase of the waveform of the received signal and also decode the data of the waveform. Using the resulting information from the phase tracking and the data decoding, the processing circuitry may be configured to determine a station clock difference and a propagation delay for the timing signal. The phase tracking may be implemented using, for example, a tracking loop and associated tracking loop calculations. According to some example embodiments, a plurality of tracking loops (e.g., eight or more) may be implemented by the processing circuitry in a two-way approach. If the forward and reverse RF channels are symmetric, then the propagation delay will cancel, and therefore an accurate measurement of the clock differences between the station clocks can be determined and leveraged in, for example, PNT applications. Accordingly, the processing circuitry may be configured to perform various high-level processing activities, including the determination and calculation of clock differences, packet generation, scheduling, command, and telemetry for the time transfer modem.

According to some example embodiments, the time transfer modem may employ a system-on-a-module (SoM) solution. According to some example embodiments, implementation in a SoM context supports significant cost reductions and availability relative to conventional solutions. As such, the time transfer modem, according to some example embodiments, may include other communications interfaces for command and telemetry such as, for example, an Ethernet interface, an Inter-Range Instrumentation Group (TRIG) interface, and the like. Further, with respect to physical form factors, the time transfer modem may be less than 2 inches tall (e.g., about 1.7 inches), less than 6 inches wide (e.g., about 5.6 inches) and about 10 inches deep.

Referring now to FIG. 1, an example time transfer system 100 (herein sometimes referred to as a "system 100," according to some example embodiments, is shown. The system 100 includes two stations 101 and 102. The station 101 includes a clock 110 and a time transfer modem 115 (herein sometimes referred to as a "modem 115"). The station 102 includes a clock 120 and a time transfer modem 125. The clocks 110 and 120 may output an interval pulse as a clock signal that is, for example, a one pulse per second signal.

System 100 illustrates an implementation of a two-way time transfer scheme, where station 101 and station 102 are configured to simultaneously exchange timing signals. In the system 100, a simplified approach is shown where the signaling occurs directly between the modem 115 and the modem 125. Such a simplified example system may be representative of a ground system where the modems 115 and 125 are connected via cabling (e.g., fiber optic cabling). Each modem 115 and 125 is configured to generate a timing signal for transmission to the other modem that is based on the local clock and can be used for clock differential analysis. The clock signal may be modulated or otherwise prepared for transmission at a desired frequency. As further described below, according to some example embodiments, the modem may include data in the timing signal indicative of timing information and telemetry information. Further, the phase of the timing signal may be a means for conveying precise information about the clock time of a station.

As such, the modem 115 may interface with the clock 110 to generate the timing signal 111 for transmission to the station 102 and the modem 125. Similarly, the modem 125 may interface with the clock 120 to generate the timing signal 121 for transmission to the station 101 and the modem 115. Modem 115 and 125 may be configured to receive a timing single from the other, and compare the received timing signal from the remote modem to a local clock signal from the local clock to determine a time difference. According to some example embodiments, each modem 115 and 125 may also include a time interval counter (TIC) that is configured to evaluate the time difference between the local clock and the modem's internal time scale, as well as the time delays of the modem's receive and transmit signal path.

The exchange of timing signals 111 and 121 as shown in the system 100 is exemplary of a two-way time transfer system. If the paths between the stations 101 and 102 are reciprocal or substantially reciprocal, the delays caused by the medium between the stations can cancel, thereby simplifying the time transfer analysis relative to, for example, a one-way system. As such, according to some example embodiments, the modems 115 and 125 can be configured to determine a clock difference between the clocks 110 and 120 and correct for any mis-synchronization. To do so, according to some example embodiments, the modems 115 and 125 may be configured to apply a correction to one of the clocks, or to construct a paper clock that is the average of the two clocks.

In this way, the modems 115 and 125 may be configured to operate to perform a timing comparison of the local and remote clocks. For example, the modem 115 may be configured to receive the timing signal 121 from the modem 125 and measure a difference, for example as an interval count, between the received timing signal 121 and the local clock signal from clock 110.

Figure 2:
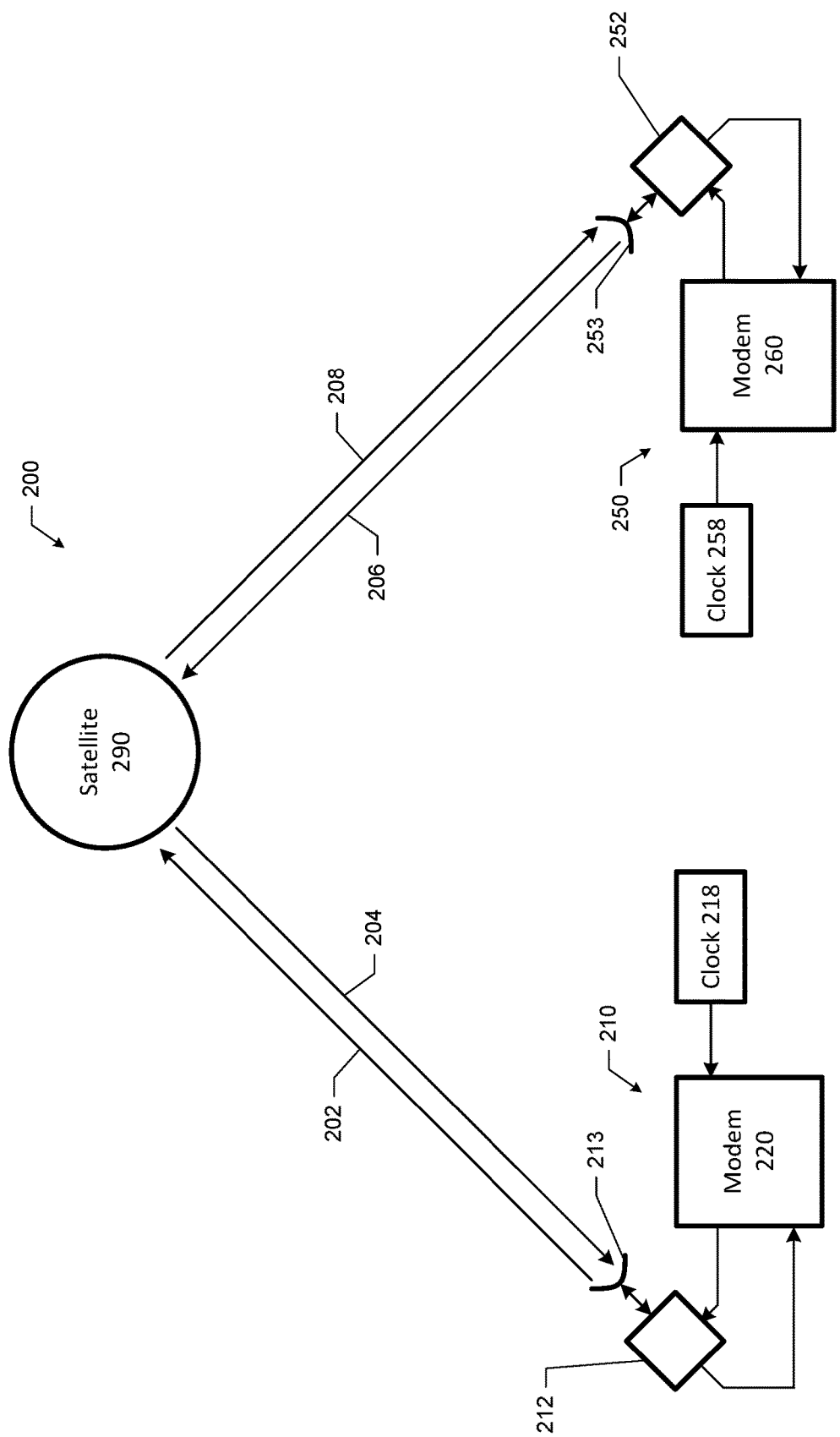
FIG. 2 illustrates an example time transfer system including time transfer modems interfacing through a satellite according to some example embodiments.

Now referring to FIG. 2, a time transfer system 200, according to some example embodiments, including time transfer modems interfacing through a satellite is provided. For example, if the stations for time synchronization are a large distance apart, transmission of time signals via a satellite between the stations may be an option. The use of two-way time transfer techniques in the context of a satellite system has additional advantages, such as, for example, that the satellite location is needed only to direct the antennas and not to compute distances, the effects of the ionosphere and troposphere on time transfer can be sub-nanosecond, precise locations of the ground stations and the associated clocks do not need to be known beyond the locations that might be provided on a geodetic map (and in consideration of the Sagnac effect which can be readily addressed), and equipment delays can be calibrated using standard values based on a transfer standard.

The system 200 of FIG. 2 is similar to the system 100 with the exception of the involvement of the satellite 290, which may be in orbit (e.g., geosynchronous orbit) around the Earth. Similar to the system 100, the system 200 includes a station 210 and a station 250, both of which may be ground stations. The station 210 may include a radio frequency (RF) front end 212, an antenna assembly 213, a time transfer modem 220, and a clock 218. According to some example embodiments, the RF front end 212 may be a component of the time transfer modem 220. The RF front end 212 may be configured to convert signals from/to baseband frequencies or radio frequencies, and may interface with the antenna assembly 213 (which may include a focusing dish) to transmit and receive timing signals. The time transfer modem 220 may operate, according to some example embodiments, as provided above and as otherwise described herein to perform time transfer, based on signaling received from a remote station and a local time signal provided by the clock 218. Similarly, the station 250 may include an RF front end 252, an antenna assembly 253, a time transfer modem 260, and a clock 258 that are configured to operate in the same or similar manner.

The modem 220 may be configured to generate and cause transmission of a timing signal 202 for the station 210 based on a clock signal from the clock 218. The timing signal 202 may be transmitted to the satellite 290 (uplink), which may re-transmit the timing signal 202 as timing signal 208 to the station 250 (downlink). Similarly, the modem 260 may be configured to generate and cause transmission of a timing signal 206 for the station 260 based on a clock signal from the clock 258. The timing signal 206 may be transmitted to the satellite 290 (uplink), which may re-transmit the timing signal 206 as timing signal 204 to the station 210 (downlink).

The inclusion of the satellite 290 in the system 200 introduces a number of additional parameters relative to, for example, a direct cabled system. Parameters such as delays in ground station equipment and due to atmospheric propagation may be considered. Additionally, delay introduced by the equipment of the satellite 290 and the effects of the Earth's rotation may also be considered. In particular, the rotation of the Earth may introduce an effect, known as the Sagnac effect, which can introduce a non-reciprocity to the signal propagation. However, since the location relationships between the stations 210 and 260, and the satellite 290 can be generally known, the time transfer modems can be configured to compensate for this affect in the received timing signals. In this regard, according to some example embodiments, the timing signals may encode telemetry information that may be used in the determinations of clock differences to compensate for the Sagnac effect.

Figure 3:
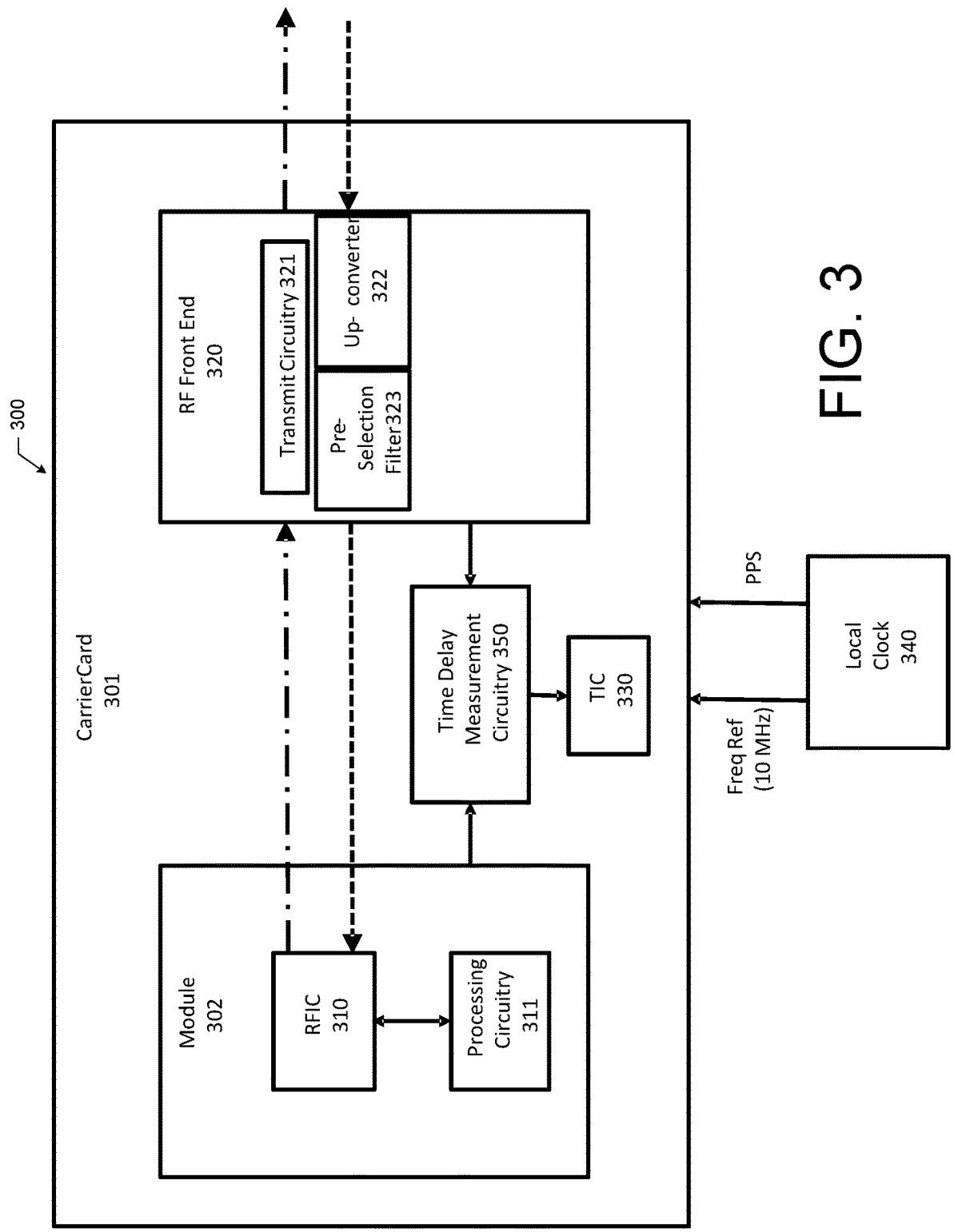
FIG. 3 illustrates a functional block diagram of an example time transfer modem according to some example embodiments.

Now referring to FIG. 3, a functional block diagram of a time transfer modem 300, for a local or remote station according to some example embodiments described herein is provided. The time transfer modem 300 may include and be constructed in a number of different ways. According to some example embodiments, the time transfer modem 300 may include various circuitry for supporting time transfer functionalities to synchronize clocks between the time transfer modem 300 and one or more remote time transfer modems that operate similarly. In this regard, the time transfer modem 300 may include a carrier card 301, a module 302, a radio frequency (RF) front end 320, time delay measurement circuitry 350, a TIC 330, as well as other components to support operation of the time transfer modem 300. It is understood that the block diagram of FIG. 3 provides some functional components of the time transfer modem 300, but one of skill in the art would appreciate that other sub-components and operably coupled supporting components may be included. Additionally, the time transfer modem 300 may be operably coupled to, or include, a local clock 340 for the station of the time transfer modem 300.

The carrier card 301 may be foundational base card to which other circuitry components may be operably coupled. According to some example embodiments, the carrier card 301 may include some supporting circuitry, traces, and the like to facilitate connectivity between boards and modules that are operably coupled to the carrier card 301. As further described below, the time delay measurement circuitry 350 may be disposed on the carrier card 301

The module 302 of the time transfer modem 300 may include various circuitry that may be configured to support time transfer functionality, and can be embodied in a number of different ways. The module 302 may be sub-system of the time transfer modem 300 that is operably coupled to the carrier card 301. According to some example embodiments, the module 302 may include a system-on-a-module (SoM) that is structured to support RF communications through operation with an RF front end, such as the RF front end 320. In this regard, the module 302 may include a radio frequency integrated circuit (RFIC) 310, processing circuitry 311 (e.g., including a field programmable logic array (FPGA)), as well as other supporting circuitry, such as, for example, one or more processors, memory devices, amplifiers, digitizers, and the like.

The processing circuitry 311 of the module 302 may include, for example, a collection of programmable logic gates, a memory, and/or a processor. Through configuration and operation of the processing circuitry 311, the processing circuitry 311 may be configurable to perform various operations as described herein, including the operations and functionalities described with respect to example embodiments of time transfer modems. In this regard, the processing circuitry 311 may be configured to perform computational processing, memory management, and manage communications, according to an example embodiment.

In some embodiments, the processing circuitry 311 may be embodied as a circuit chip, a circuit chip set, and/or a module. In other words, the processing circuitry 311 may include one or more physical packages (e.g., circuit chips or modules) including materials, components or wires on a structural assembly (e.g., a baseboard). The processing circuitry 311 may be configured to receive inputs (e.g., via peripheral components), perform actions based on the inputs, and generate outputs (e.g., for provision to peripheral components). In an example embodiment, the processing circuitry 311 may include one or more instances of a processor, associated circuitry, and memory. As such, the processing circuitry 311 may be embodied as or include a circuit chip (e.g., an integrated circuit chip, such as a field programmable gate array (FPGA)) configured with hardware, software, or a combination of hardware and software) to perform operations described herein.

In an example embodiment, the memory of the processing circuitry 311 may include one or more non-transitory memory device such as, for example, volatile or non-volatile memory that may be either fixed or removable. The memory may be configured to store information, data, applications, instructions or the like for enabling, for example, the functionalities described with respect to time transfer. The memory may operate to buffer instructions and data during operation of the processing circuitry 311 to support higher-level functionalities, and may also be configured to store instructions for execution by the processing circuitry 311. The memory may also store various information including spreading codes in the form of memory codes, previously determined clock differences, and the like. According to some example embodiments, various data stored in the memory may be generated based on other data and stored or the data may be retrieved via the communications interface and stored in the memory.

In an example embodiment, the processing circuitry 311 may be configured to execute instructions stored in the memory or otherwise accessible to the processing circuitry 311. As such, whether configured by hardware or by a combination of hardware and software, the processing circuitry 311 may represent an entity (e.g., physically embodied in circuitry—in the form of processing circuitry 311) capable of performing operations according to example embodiments while configured accordingly. Thus, for example, when the processing circuitry 311 is embodied as an ASIC, FPGA, other programmable logic, or the like, the processing circuitry 311 may be specifically configured hardware for conducting the operations described herein. Alternatively, as another example, when the processing circuitry 311 is embodied as an executor of software instructions, the instructions may specifically configure the processing circuitry 311 to perform the operations described herein.

According to some example embodiments, the RFIC 310 of the module 302 may be a circuit chip or a collection of circuit chips that are configured to transmit and receive radio frequency waveforms. The RFIC 310 may, in many cases, be used to support wireless communications and may be configured to operate as one or more radios of a communications device. The RFIC 310 may have an operational frequency range within which the RFIC 310 can operate. For example, according to some example embodiments, the RFIC 310 may be tunable from 0.1 to 6000 MHz as the operational frequency range. However, according to some example embodiments, because filtering capabilities of the RFIC 310 may cause distortion in the time-transfer due to the introduction of delays through the RFIC 310 (delay that may vary with frequency), some or all of the tuning capabilities of the RFIC 310 may be disabled, the RFIC 310 may be configured to operate at a fixed, single frequency. Accordingly, rather than relying upon internal filtering capabilities of the RFIC 310, the time transfer modem 300 may be configured to cause the RFIC 310 to rely upon the RF front end 320 to perform filtering (e.g., via the pre-selection filter 323). When operating with the RF front end 320, the RFIC 310 may be configured to support a tunable range from about 800 to about 2400 MHz for the time transfer modem 300, which exceeds conventional modems performing time transfer that are often limited to 950 to 1450 MHz as intermediate frequencies that can require an external block converter to shift these frequencies up to X- or Ka-band for transmission.

According to some example embodiments, for time transfer as provided herein, a frequency range or band may be selected and used. The band may be a frequency range of interest for time transfer signaling, and the frequency range of interest may be, for example, from about 800 MHz to 2400 Mhz, thereby covering about a 1600 MHz band. In this regard, the RFIC 310, according to some example embodiments, and possibly as a component of an SoM, may be tunable within this range (e.g., to a single frequency at a time). As such, the RFIC 310 may have a high susceptibility to, for example, out-of-band signals (e.g., signals out of the frequency band of interest) but within the operational frequency range of the RFIC 310 that can cause components of the RFIC 310 (e.g., amplifiers and digitizers) to be driven into saturation.

Additionally, the time transfer modem 300 may be operably coupled to the local clock 340 for the station. The local clock 340 may therefore be external to the time transfer modem 300 and may provide local clock signals to the time transfer modem 300 for use when performing a time transfer analysis. In this regard, the local clock 340 may include a oscillator of a desired frequency, where the frequency of the oscillator is used to track time. The local clock 340 may provide a frequency reference signal (e.g., at 10 MHz) and a pulse per second (PPS) signal.

Additionally, the time transfer modem 300 may include an radio frequency (RF) front end 320. The RF front end 320 may be configured to convert baseband signals, for example provided by the RFIC 310, into RF signals for transmission via an antenna on a transmission channel. Also, according to some example embodiments, the RF front end 320 may be configured to convert RF signals received at an antenna on a receive channel to baseband or another selected band for provision to the RFIC 310. The RF front end 320 may include various circuit components that support up-conversion and down-conversion of signals. In this regard, the RF front end 320 may include transmit circuitry 321, an up-converter 322, a pre-selection filter 323, as well as other circuitry, such as, for example, an RF amplifier configured to amplify weak signals without adding noise, a local oscillator, a mixer for generating signals at a desired frequency, and the like. According to some example embodiments, the RF front end 320 may be configured to support RF communications via one or more antennas. Additionally, although not depicted in FIG. 3, the time transfer modem 300 may include an antenna that may operate in cooperation with an focusing dish. Signals for transmission may be provided via the transmit channel from the RF front end 320 to the antenna. Alternatively, signals for receipt may be received by the antenna on the receive channel and provided to the RF front end 320. According to some example embodiments, the RFIC 310, the RF front end 320, and the pre-selection filter 323 may be on a common SoM, which may be in connection with the carrier card 301.

With respect to the transmit channel, the RF front end 320 may be configured to receive a signal for transmission from the RFIC 310 (e.g., a timing signal) for receipt by the transmit circuitry 321. The transmit circuitry 321 may be configured to, for example, up-convert the signal received from the RFIC 310. Also, the transmit circuitry 321 may be configured to otherwise condition the signal provided by the RFIC 310 for transmission as a radio signal for delivery to, for example, a remote station and a remote time transfer modem.

The RF front end 320 may also be configured to receive an input (e.g., one or more signals within an input band) on the receive channel to support time transfer with the remote station. The input, according to some example embodiments, may have a relatively wide bandwidth and may include a timing signal originating from the remote station at a timing signal frequency, as well as many other signals. The timing signal frequency may be within the frequency range of interest for time transfer. The input may also include adjacent signals at adjacent frequencies (i.e., within adjacent channels) within a band of the input as received by the time transfer modem. According to some example embodiments, the adjacent signals on adjacent channels may be introduced in the context of satellite signaling where, for example, other users are assigned to adjacent channels and transmit signals up to 40 dB stronger than the timing signals. In this regard, satellite bands are divided into adjacent channels, often 5 or 10 MHz wide (e.g. one channel is 1000-1010 MHz, the next channel is 1010-1020 MHz, etc.). According to some example embodiments, time-transfer may be implemented as a low-rate, spread-spectrum technique (i.e. low power). However, neighboring channels may be operating to support high-rate data having up to 40 dB stronger signal levels, and issues can arise when such strong signals are also included in the input.

The timing signals used in time transfer, according to some example embodiments, may be spread spectrum signals, again, with a relatively wide bandwidth. The use of a wide bandwidth facilitates the ability to perform accurate tracking with sub-nanosecond accuracy. As such, the timing signal, as a spread spectrum signal may be generated, by a time transfer modem, by modulating low-rate data with a spreading code. According to some example embodiments, the spreading code may be, for example, a memory code. According to some example embodiments, the memory code can be a sequence of binary symbols (or chips) that represent one information bit. To transmit an information bit of '0', the memory code itself may be transmitted. To transmit information bit of '1', the memory code may be inverted for transmission. The memory code itself can be a relatively fast sequence of 0s and 1s. According to some example embodiments, a preferable code may be balanced (i.e., having approximately an equal number of 0s and 1s) and also avoid long strings of 0s or 1s (e.g., strings of longer than 5 or 10). Also, the memory code, according to some example embodiments, can avoid including large false peaks in the memory code's auto-correlation. Also, the memory code, according to some example embodiments, can be defined to avoid large peaks in the cross-correlation of any other code in the system or family.

Additionally, according to some example embodiments, each time transfer modem within a system may be assigned a unique memory code. Further, the memory code may be a code that is stored in a memory of the transmitting device and is read out of the memory for use as a spreading code for spread spectrum signaling. According to some example embodiments, the memory code may have a defined length that supports channel sharing amongst greater than four time transfer modems. The length of the memory code may be relatively long (e.g., 2487 chips or longer, or about 4000 chips). Further, according to some example embodiments, the memory code is not a polynomial-generated code and can be longer than 511 or 1023 chips. The longer length memory codes enable, for example, more time transfer modems to share a common channel. Further, a pattern and length of the memory code for the timing signal may be adjustable thereby offering significant flexibility in the construction of the timing signal to support multiple time transfer modems (e.g., up to 32 or more time transfer modems) operating on common channels. The adjustability of the memory code may operate to improve the tracking performance for practical scenarios. In this regard, the chipping rate may be different for each time transfer modem in a system and each time transfer modem may have a unique memory code with, for example, a unique length (e.g., 2481 chips, 2487 chips, or the like). Such variation, according to some example embodiments, can modulate a correlation bias caused by common code length such that the bias is present outside the receiver tracking loop bandwidth. Accordingly, a lower tracking variance can be yielded. Additionally, the use of the memory code also ensures that the chipping rate is, for example, relatively prime with respect to a sampling rate, which may also reduce correlation bias and improve accuracy.

According to some example embodiments, the RF front end 320 may also be configured to up-convert, via the up-converter 322, the input that includes the timing signal and the adjacent signals. By doing so, the RF front end 320 may generate an up-converted signal centered at a select frequency that is outside of the frequency range of interest for time transfer but within the operational frequency range of the RFIC 310. According to some example embodiments, the input may be up-converted to, for example, about 5.8 or about 6 GHz. The up-converted signal may therefore include an up-converted timing signal at an up-converted timing signal frequency and up-converted adjacent signals at up-converted adjacent signal frequencies (e.g., within the adjacent channels). At least one of the up-converted adjacent signal frequencies may be outside of (e.g., greater than or less than) the operational frequency range of the RFIC 310.

According to some example embodiments, the RF front end 320 may include a pre-selection filter 323. The pre-selection filter 323 may be a component of the RF front end 320 that can be configured to filter or attenuate signals of a certain frequency as, for example, a high-pass filter, a low-pass filter, or a band-pass filter. According to some example embodiments, the pre-selection filter 323 may be operably coupled to the receive channel of the time transfer modem 300 and tuned to a select frequency or a select frequency range. According to some example embodiments, the pre-selection filter 323 may be configurable for different frequencies and ranges. According to some example embodiments, the pre-selection filter 323 may be the single or only filter that is used in the receive channel between the RF front end 320 and the RFIC 310, and may be implemented in lieu of a bulky filter bank.

The pre-selection filter 323 may be configured to receive the up-converted signal from the up-converter 322 of the RF front end 320, and the pre-selection filter 323 may be configured to attenuate, within the up-converted signal, the up-converted adjacent signals at the up-converted adjacent frequencies, or a portion thereof, to generate a filtered timing signal at the select frequency. In this regard, the pre-selection filter 323 may be designed for operation, for example, near an upper tuning limit of the RFIC 310's operating range, which is outside of the frequency band of interest for time transfer. By doing so, the pre-selection filter 323 may support an ability to leverage a signal chain of the RFIC 310 and also remove high power signals (e.g., adjacent signals) from the original input that otherwise would have caused amplifiers and other RF circuitry of the RFIC 310 to become saturated and operate in a manner that is undesirable for time transfer. In this regard, the pre-selection filter 323 may therefore be configured to attenuate the up-converted adjacent signals at the up-converted adjacent frequencies to prevent or inhibit saturation of one or more amplifiers or one or more digitizers of the RFIC 310. According to some example embodiments, because the input was up-converted to, for example, about 6 GHz, the up-converted timing signal may pass through the pre-selection filter 323, while the strong adjacent signals are attenuated before the, then filtered signal, is provided to the RFIC 310 for further processing and determining a clock difference.

Accordingly, the RFIC 310 may be configured to, according to some example embodiments, receive the filtered timing signal from the pre-selection filter 323. Upon receipt of the filtered timing signal, the RFIC 310 may be configured to down-convert the filtered timing signal. In this regard, the filtered timing signal may be down-converted to a desired frequency that is within the frequency range of interest for time transfer. Additionally, according to some example embodiments, the RFIC 310 may be configured to digitize the filtered timing signal. The RFIC 310 therefore may be configured to generate a digitized timing signal via down-conversion and digitization.

The RFID 310 may then provide the digitized timing signal to the processing circuitry 311 for further processing. In this regard, the processing circuitry 311 may be configured to determine, based on the digitized timing signal and the local clock signal, a clock difference between the local clock and a remote clock of the remote station. Such determination of the clock difference may be conducted in a number of ways. For example, a comparison or subtraction of signals may be performed to determine a delta or difference between the signals that is indicative of the timing difference between the signals. According to some example embodiments, the processing circuitry 311 may employ tracking, possibly in the form of a tracking loop, and demodulate the digitized timing signal to perform the comparison with the local clock signal.

Further according to some example embodiments, the RFIC 310 may be configured to extract and consider aspects of the waveform of the timing signal, as received by the processing circuitry 311. In this regard, the waveform of the timing signal may include encoded coarse timing and telemetry information in the form of data included in the signal. Also, according to some example embodiments, precise timing information may be provided via a phase of the waveform of the timing signal. In this regard, the phase of the signal itself may provide insights in to aspects relating to the precise timing of the received signal, relative to a local clock signal. As such, the processing circuitry 311 may be configured to decode the coarse timing and telemetry information and implement a phase tracking loop to analyze the precise timing provided by the phase of the waveform of the timing signal. According to some example embodiments, the phase tracking loop of the processing circuitry 311 may be one of a plurality of phase tracking loops implemented by the processing circuitry 311. Each of the phase tracking loops of the plurality of phase tracking loops may be configured to analyze a respective phase of a respective timing signal from a respective remote station. In this regard, the time transfer modem 300, and more specifically the processing circuitry 311, may be configured to implement, for example, more than eight or sixteen tracking loops to thereby perform time transfer analysis on signals involving the more than the eight or the sixteen time transfer modems.

Additionally, according to some example embodiments, the time transfer modem 300 may also include time delay measurement circuitry 350, possibly in the form of a time delay circuit chip. The time delay measurement circuitry 350 may be external to the processing circuitry 311. According to some example embodiments, the time delay measurement circuitry 350 may be disposed, separate from the module 302 and the RF front end 320, for example, on carrier card 301. In other words, the time delay measurement circuitry 350 may be external to the RFIC 310 and the processing circuitry 311, and an SoM that may include the RFIC 310 and the processing circuitry 311. The time delay measurement circuitry 350 may include circuitry configured measure internal delays within the time transfer modem 300, which may not be constant on critical signal paths associated with group delay. In this regard, the time delay measurement circuitry 350 may be configured to measure delays within the RFIC 310, the processing circuitry 311 (i.e., within the module 302). Additionally, the time delay measurement circuitry 350 may be configured to measure delays in the RF front end 320, such as, in the transmit circuitry 321. Additionally, internal delays of the time transfer modem 300 may vary from boot to boot of the RFIC 310 and processing circuitry 311, and these internal delays may vary as a function of temperature. Such internal delays may be, according to some example embodiments, on the order of tens of nanoseconds, thereby creating clear issues with arriving at sub-nanosecond solutions. According to some example embodiments, the internal delays may be measured, by the time delay measurement circuitry 350, against the signal provided by the local clock 340. In this regard, a frequency reference (i.e., a 10 MHz frequency reference) or the clock signal in the form of a plus-per-second (PPS) signal may be used. According to some example embodiments, a time interval counter (TIC) 330 may be employed for with a signal from the local clock 340 to determine the internal delays. The TIC 330 may be implemented in hardware or software, for example, as a component of the time delay measurement circuitry 350, and may be configured to determine delays between the local clock signal and the timescale of the time transfer modem 300.

The measurement of the internal delays can then be applied to the clock difference analysis to further improve the accuracy of the clock difference determination, locally or at the remote station. In this regard, to measure such internal delays, the time delay measurement circuitry 350 may be configured to receive and utilize the local clock signal from the local clock 340. Accordingly, the time delay measurement circuitry 350 may be configured to measure, for example, a transmit delay within, for example, the RFIC 310, based on the clock signal (e.g., one pulse per second). The time delay measurement circuitry 350 may therefore be configured to provide the transmit delay to the RFIC 310 for use in determining the clock difference by a remote station.

According to some example embodiments, the time delay measurement circuitry 350 may be configured to receive and measure the local time signal from the local clock 340, which, according to some example embodiments, may be an external clock relative to processing circuitry 311. Accordingly to some example embodiments, the time delay of the transmit signal path may also be measured by the time delay measurement circuitry 350 by modulating the clock signal as an interval pulse signal onto, for example, a 6 GHz output of the processing circuitry 311 or RFIC 310. Further, a space RF output of the processing circuitry 311 or the RFIC 310 may, for example, be used to generate a 6 GHz local oscillator to demodulate the modulated signal back to baseband pulses per second and, as such, a measurement may be taken against the timescale of the time transfer modem 300. The timescale of the time transfer modem 300 refers to a timing of the components of the time transfer modem 300 against, for example, an immediately local oscillator on the same board or within the same sub-system (as opposed to the local clock 340 of the station). Additionally, the receive signal path may be measured by the time delay measurement circuitry 350 by implementing an internal loopback, and, thereby measurements of a combined transmit and receive delay may be made against the timescale for the time transfer modem 300. The delay in the receive signal path may be determined, for example, by then subtracting the transmit delay. In this manner, the time delay measurement circuitry 350 may facilitate the time transfer modem 300's ability to achieve highly accurate radiometric measurements with, for example, an SoM, such as module 302 by being able to measure the delays that may be introduced by the SoM.

Figure 4:
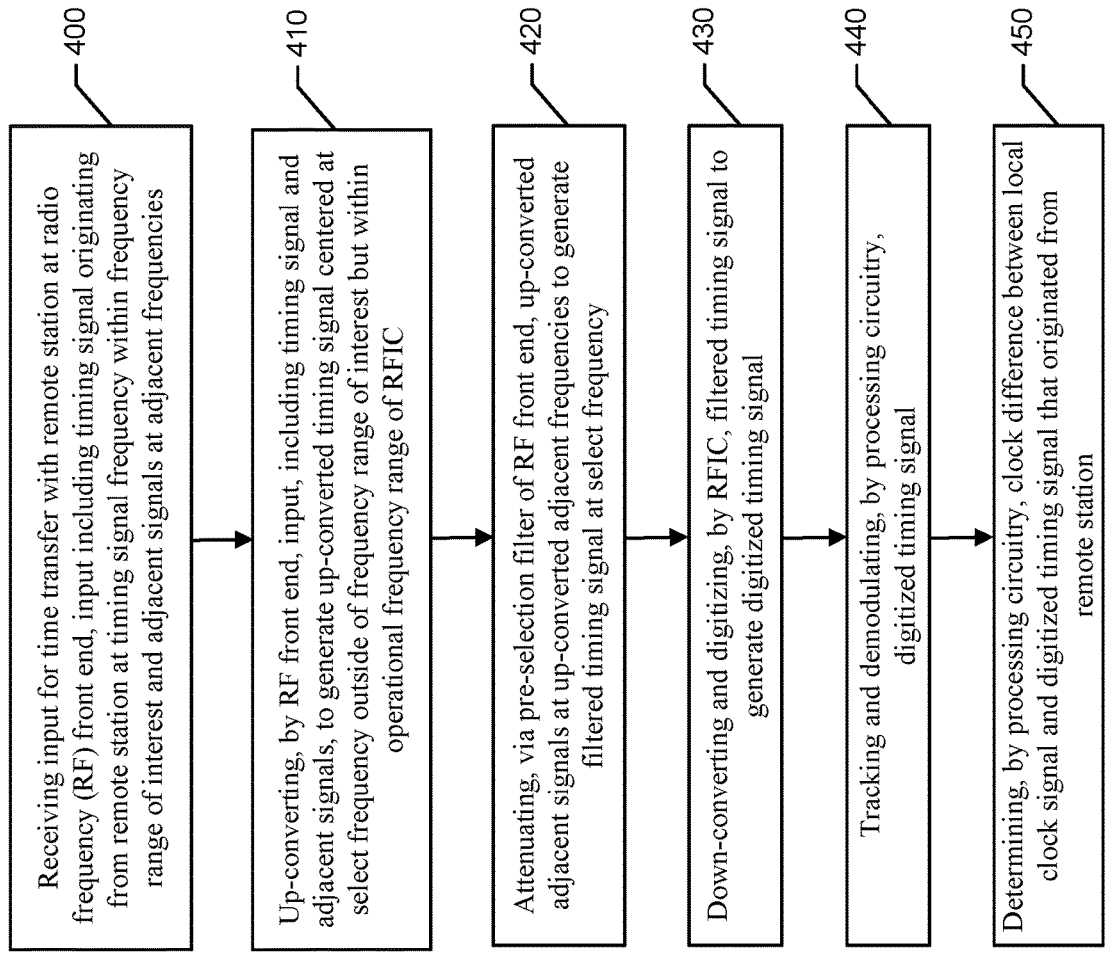
FIG. 4 illustrates a flow chart of an example method for implementing time transfer according to some example embodiments.

Now referring to FIG. 4, an example method for implementing a time transfer between two stations (i.e., a local station and a remote station) is provided. In this regard, at 400, the example method may include receiving an input for time transfer with a remote station at a radio frequency (RF) front end. The input may include a timing signal originating from the remote station at a timing signal frequency that is within the frequency range of interest and adjacent signals at adjacent frequencies. The frequency range of interest may be within an operational frequency range of a radio frequency integrated circuit (RFIC).

The example method may further include at 410 up-converting, by the RF front end, the input, including the timing signal and the adjacent signals, to generate an up-converted timing signal centered at a select frequency that is outside of the frequency range of interest but within the operational frequency range of the RFIC. Up-converting the input may also generate up-converted adjacent signals from the adjacent signals at up-converted adjacent signal frequencies. In this regard, at least one of the up-converted adjacent signal frequencies being outside of the operational frequency range of the RFIC.

The example method may also include, at 420, attenuating, via a pre-selection filter of the RF front end, the up-converted adjacent signals at the up-converted adjacent frequencies to generate a filtered timing signal at the select frequency. Additionally, at 430, the example method may include down-converting and digitizing, by the RFIC, the filtered timing signal to generate a digitized timing signal. At 440, the example method may include tracking and demodulating, by processing circuitry, the digitized timing signal. Also, at 450, the example method may include determining, by the processing circuitry, a clock difference between a local clock signal and the digitized timing signal that originated from the remote station.

Additionally, according to some example embodiments, down-converting the filtered timing signal to a desired frequency that is within the frequency range of interest. Additionally or alternatively, receiving the input may include receiving the input, where the input includes the timing signal as a spread spectrum signal that is spread based on a memory code.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:
1. A time transfer modem comprising:
 a radio frequency integrated circuit (RFIC) having an operational frequency range, wherein a frequency range of interest for time transfer signaling is within the operational frequency range of the RFIC;
 a tunable radio frequency (RF) front end comprising a pre-selection filter, the RF front end configured to:
  receive an input for time transfer with a remote station, the input comprising a timing signal originating from the remote station at a timing signal frequency that is within the frequency range of interest and adjacent signals at adjacent frequencies;
  up-convert the input, including the timing signal and the adjacent signals, to generate an up-converted timing signal centered at a select frequency that is outside of the frequency range of interest but within the operational frequency range of the RFIC, wherein up-converting the input also generates up-converted adjacent signals from the adjacent signals at up-converted adjacent signal frequencies, at least one of the up-converted adjacent signal frequencies being outside of the operational frequency range of the RFIC; and
  attenuate, via the pre-selection filter, the up-converted adjacent signals at the up-converted adjacent signal frequencies to generate a filtered timing signal at the select frequency;
 wherein the RFIC is configured to down-convert and digitize the filtered timing signal to generate a digitized timing signal;

wherein the time transfer modem further comprises processing circuitry configured to:
track and demodulate the digitized timing signal; and
determine a clock difference between a local clock signal and the digitized timing signal that originated from the remote station.

2. The time transfer modem of claim 1, wherein the RFIC is configured to down-convert the filtered timing signal to a desired frequency that is within the frequency range of interest.

3. The time transfer modem of claim 1, wherein the frequency range of interest is a band of about 1600 MHz.

4. The time transfer modem of claim 3 further comprising time delay measurement circuitry that is external to the processing circuitry and is configured to:
receive the local clock signal; and
measure a transmit delay within the RFIC of the time transfer modem based on the local clock signal;
wherein the RFIC is further configured to determine the clock difference based on the transmit delay.

5. The time transfer modem of claim 1, wherein a waveform of the timing signal comprises coarse timing information and telemetry information encoded into the waveform;
wherein the waveform further comprises precise timing information indicated in a phase of the waveform.

6. The time transfer modem of claim 5, wherein the processing circuitry is configured to decode the coarse timing information and the telemetry information and implement a phase tracking loop to analyze the precise timing information.

7. The time transfer modem of claim 5, wherein the processing circuitry is configured to decode the coarse timing information and telemetry information and implement a phase tracking loop to analyze the precise timing information provided by the phase of the waveform of the timing signal;
wherein the phase tracking loop of the processing circuitry is one of a plurality of phase tracking loops implemented by the processing circuitry, each of the phase tracking loops of the plurality of phase tracking loops being configured to analyze a respective phase of a respective timing signal from a respective remote station.

8. The time transfer modem of claim 1, wherein the RFIC and processing circuitry are components of a system-on-a-module (SoM).

9. The time transfer modem of claim 1 wherein the pre-selection filter is configured to attenuate the up-converted adjacent signals at the up-converted adjacent signal frequencies to prevent or inhibit saturation of one or more amplifiers or one or more digitizers of the RFIC.

10. The time transfer modem of claim 1, wherein the RF front end is configured to receive the input comprising the timing signal, the timing signal being a spread spectrum signal that is spread based on a memory code.

11. The time transfer modem of claim 10, wherein the memory code has a defined length that supports channel sharing amongst greater than four time transfer modems; and
wherein the memory code used to generate the timing signal is unique to the remote station within a system comprising a plurality of stations including a local station and the remote station.

12. The time transfer modem of claim 10, wherein a pattern and length of the memory code for the timing signal is adjustable.

13. The time transfer modem of claim 10 wherein the memory code is not a polynomial-generated code.

14. A system comprising:
a remote station comprising a remote clock and a remote time transfer modem, the remote clock configured to output a remote clock signal for use by the remote time transfer modem to generate a timing signal for transmission;
a communications satellite in orbit configured to receive and re-transmit the timing signal; and
a local station comprising a local clock and a local time transfer modem, the local clock is configured to output a local clock signal to the local time transfer modem;
wherein the local time transfer modem comprises:
a radio frequency integrated circuit (RFIC) having an operational frequency range, wherein a frequency range of interest for time transfer signaling is within the operational frequency range of the RFIC;
a tunable radio frequency (RF) front end comprising a pre-selection filter, the RF front end configured to:
receive an input for time transfer with the remote station, the input comprising the timing signal originating from the remote station at a timing signal frequency that is within the frequency range of interest and adjacent signals at adjacent frequencies;
up-convert the input, including the timing signal and the adjacent signals, to generate an up-converted timing signal centered at a select frequency that is outside of the frequency range of interest but within the operational frequency range of the RFIC, wherein up-converting the input also generates up-converted adjacent signals from the adjacent signals at up-converted adjacent signal frequencies, at least one of the up-converted adjacent signal frequencies being outside of the operational frequency range of the RFIC; and
attenuate, via the pre-selection filter, the up-converted adjacent signals at the up-converted adjacent signal frequencies to generate a filtered timing signal at the select frequency;
wherein the RFIC is configured to down-convert and digitize the filtered timing signal to generate a digitized timing signal;
wherein the local time transfer modem further comprises processing circuitry configured to:
track and demodulate the digitized timing signal; and
determine clock difference between the local clock signal and the digitized timing signal that originated from the remote station.

15. The system of claim 14, wherein the RFIC is further configured to down-convert the filtered timing signal to a desired frequency that is within the frequency range of interest.

16. The system of claim 14, wherein the RFIC and the processing circuitry are components of a system-on-a-module (SoM).

17. The system of claim 14, wherein the RF front end is configured to receive the input comprising the timing signal, the timing signal being a spread spectrum signal that is spread based on a memory code.

18. A method for time transfer between a local station and a remote station comprising:
receiving an input for time transfer with a remote station at a radio frequency (RF) front end, the input comprising a timing signal originating from the remote station at a timing signal frequency that is within a frequency range of interest and adjacent signals at adjacent frequencies, the frequency range of interest being within an operational frequency range of a radio frequency integrated circuit (RFIC);

up-converting, by the RF front end, the input, including the timing signal and the adjacent signals, to generate an up-converted timing signal centered at a select frequency that is outside of the frequency range of interest but within the operational frequency range of the RFIC, wherein up-converting the input also generates up-converted adjacent signals from the adjacent signals at up-converted adjacent signal frequencies, at least one of the up-converted adjacent signal frequencies being outside of the operational frequency range of the RFIC; and attenuating, via a pre-selection filter of the RF front end, the up-converted adjacent signals at the up-converted adjacent signal frequencies to generate a filtered timing signal at the select frequency;

down-converting and digitizing, by the RFIC, the filtered timing signal to generate a digitized timing signal;

tracking and demodulating, by processing circuitry, the digitized timing signal; and determining, by the processing circuitry, a clock difference between a local clock signal and the digitized timing signal that originated from the remote station.

19. The method of claim 18, wherein down-converting the filtered timing signal to a desired frequency that is within the frequency range of interest.

20. The method of claim 18, wherein receiving the input comprises receiving the input comprising the timing signal as a spread spectrum signal that is spread based on a memory code.

* * * * *